June 28, 1949.　　　　V. JANKOWSKI　　　　2,474,675
TOOLHOLDER
Filed Nov. 24, 1944　　　　　　　　　　　　2 Sheets-Sheet 1
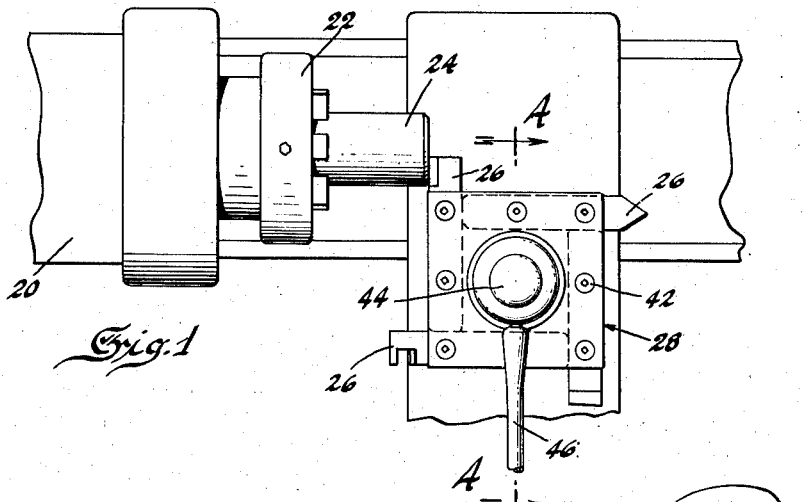
Fig. 1
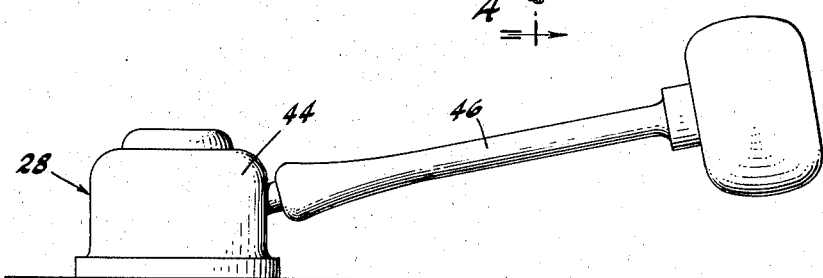
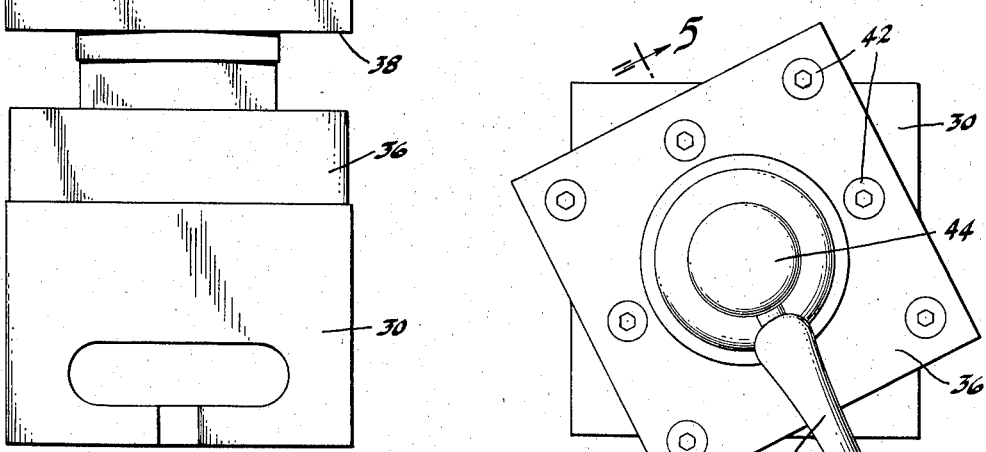
Fig. 2
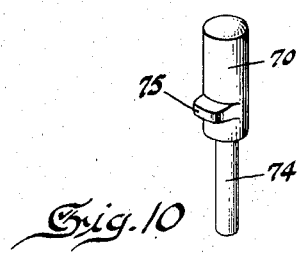
Fig. 10
Fig. 3
INVENTOR.
Vladimir Jankowski
BY
Parker & Burton
attorneys June 28, 1949. V. JANKOWSKI 2,474,675
TOOLHOLDER
Filed Nov. 24, 1944 2 Sheets-Sheet 2

INVENTOR.
Vladimir Jankowski
BY
Parker & Burton
attorneys

Patented June 28, 1949

2,474,675

UNITED STATES PATENT OFFICE 2,474,675

TOOLHOLDER

Vladimir Jankowski, Detroit, Mich.

Application November 24, 1944, Serial No. 564,959

4 Claims. (Cl. 29—49)

This invention relates to an improved tool holder adapted to carry a plurality of tools and so constructed that the several tools may be progressively indexed into proper position to act upon a piece of work carried by the machine equipped with the holder.

A further object is to provide a tool holder of simple, inexpensive construction adapted to carry a plurality of tools which holder is so constructed that upon rotation of a single handle the several tools may be progressively brought into position to act upon a piece of work.

Another object is to provide a tool holder comprising a base, a tool carrying turret rotatably supported upon the base, a handle rotatably supported upon the turret and simple sturdy mechanism contained within the holder operable at selected positions to lock the turret to the base against rotation and operable upon swinging movement of the handle to initially release said locking means and to rotatably displace the turret to progressively advance for use the tools carried by the turret and to lock the turret against rotation as each tool is advanced into working position.

Other objects, advantages and meritorious features will more fully appear from the following description, appended claims and accompanying drawings, wherein:

Figure 1 is an elevation of a fragment of a machine such as a lathe equipped with the tool holder of this application.

Figure 2 is a side elevation of the tool holder shown in Figure 1.

Figure 3 is a plan of the tool holder shown in Figure 1 with the turret at an intermediate position in its arc of swing.

Figure 10 is a perspective of the locking pin.

Figure 4:
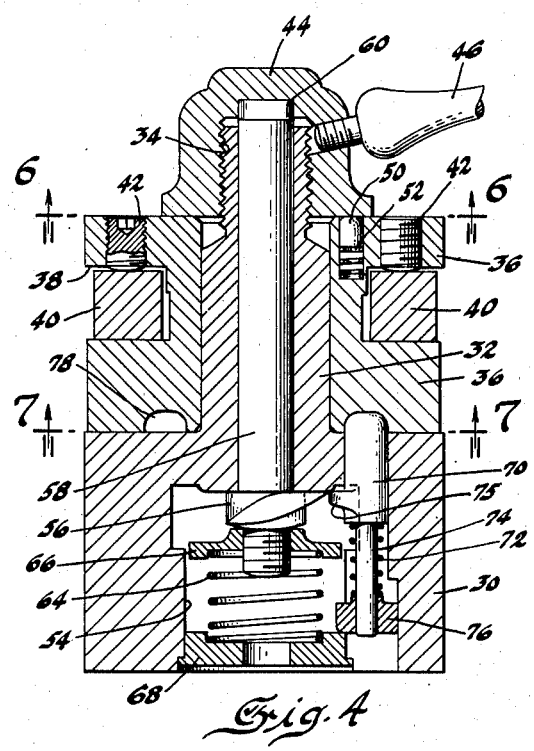
Figure 4 is a vertical sectional view taken on the line 4—4 of Figure 1.

In Figure 1 the adjustable compound of a lathe or other suitable machine is shown at 20 and the work holder 22 is shown as supporting a piece of work 24. The work is supported to be acted upon by the different tools 26 which are carried by the improved tool holder of this invention, which holder is indicated as a unit 28 in Figure 1.

This tool holder comprises a base 30 provided with an upright tubular cylindrical column 32 which is threaded at 34 at its upper end. Rotatably mounted upon the column superimposing the base is a tool carrying block or turret 36. Each of the four sides of this turret is provided with a channel or groove 38 which channel is adapted to receive a tool 26 as illustrated in Figures 1 and 3.

Inasmuch as this tool holder is designed for the purpose of progressively bringing different tools into position to act upon a piece of work, the several tools carried by the holder would commonly be different tools. Each tool may be releasably held in place upon the turret in any conventional manner as by the screws 42 shown in Figures 3 and 4.

Threaded upon the upper end of the column 32 is a cap 44. This cap is provided with a hand lever 46 as shown in Figures 2 and 4. This cap and hand lever constitute a handle element supported for rotation relative to the turret 36. Means is provided whereby the cap may pick up the turret 36 and rotate the turret in a given direction to progressively advance the tools carried by the turret into working position.

Figure 5:
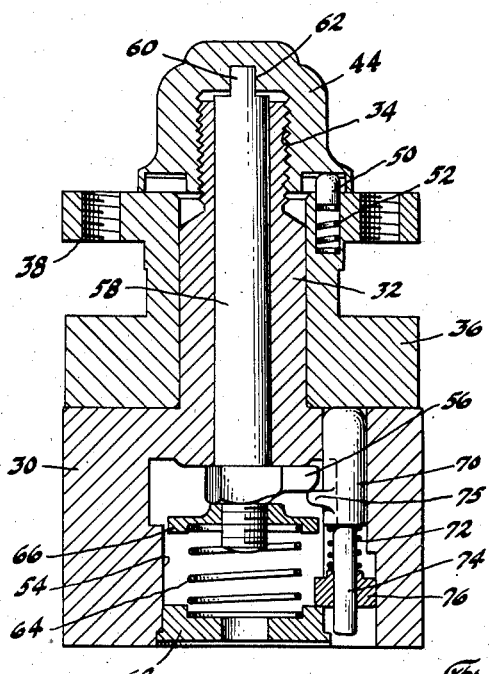
Figure 5 is a vertical sectional view taken on the line 5—5 of Figure 3.
Figure 6:
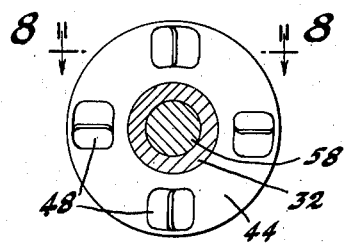
Figure 6 is a horizontal sectional view taken on the line 6—6 of Figure 4.

The lower face of the cap which rests upon the upper face of the turret is here shown as provided with a plurality of ratchet pin recesses 48. These recesses are adapted to receive the ratchet pin 50 to couple the cap with the turret to rotate the turret. The ratchet pin 50 is mounted as shown in Figures 4 and 5 within the upper face of the turret and is held upwardly by a spring 52 against the end face of the cap. When one of the recesses 48 of the cap is brought into registration with the pin 50, the spring 52 urges the pin into the recess and couples the turret with the cap for rotation thereby. Four of these recesses are shown in Figure 6 though obviously any desired number might be provided.

The base 30 is hollowed out as shown in Figures 4 and 5, providing a recess 54. Within this recess 54 is disposed a cam 56, which cam is carried by the lower end of a cam rod 58, which rod extends upwardly through the column 32 and terminates thereabove in a tang 60. The tang has a free slidable fit within a kerf 62 in the cap 44 whereby the cam rod 58 rotates with the cap while having limited axial movement relative thereto as hereinafter described.

The cam 56 may be formed integrally with the rod 58 or it may be a separate cam suitably secured to the rod to rotate with the rod. The cam rod 58 is held upwardly by a spring 64 to maintain the tang 60 within the kerf 62. Spring 64 bears at its upper end against a plate 66, which plate is threaded on to the lower end of the rod. The spring bears at its lower end against a plate 68 which latter plate is press fitted or otherwise secured within the recess 54 of the base to support the spring as shown in Figures 4 and 5.

Figure 7:
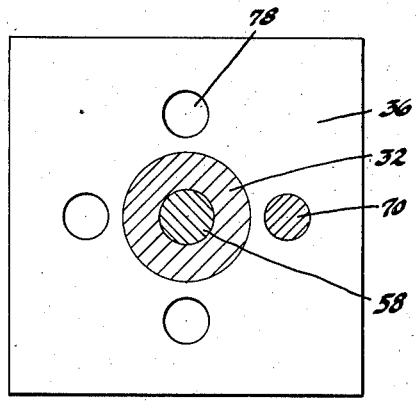
Figure 7 is a horizontal sectional view taken on the line 7—7 of Figure 4.

A locking pin 70 is provided to lock the tool carrying turret 36 to the base against relative rotatable displacement. This locking pin is mounted within a recess of the base as shown in Figures 4 and 5 and is held upwardly by a spring 72. The spring encircles the reduced end portion 74 of the pin and bears against the pin at its upper end. The lower end of the spring is supported upon a spring retainer 76 which is itself supported upon the plate 68 as shown in Figures 4 and 5. This locking pin is adapted to be urged by its spring to seat its upper end within any one of a plurality of pin recesses 78 provided in the end face of the turret as shown in Figures 4 and 7 to lock the turret to the base against rotatable displacements as shown in Figure 4. The bottom face of the turret is provided with a recess 78 for each tool carried by the turret, four being here shown. The locking pin is also adapted to be withdrawn downwardly by the cam 56 as shown in Figure 5 to free the turret for relative rotatable displacement upon the base.

In the normal locked position of the turret with one of the turret tools disposed to act upon the work, the locking pin 70 is held projected upwardly by the spring 72 and the upper end of the locking pin is engaged within a recess 78 of the turret. In this position the ratchet pin 50 is held downwardly within its mounting in the turret by the flat end face of the cap as shown in Figure 4. The handle is so disposed in this normal locked position of the turret that the end of the pin 50 engages the underface of the cap between succeeding recesses.

When it is desired to index the succeeding tool to a position to act upon the work the handle 46 is swung in a counterclockwise direction. The cap 44 rotates freely over the upper face of the turret because the ratchet pin 50 is not yet engaged within a recess in the cap. During this initial stage of rotation of the cap the meeting edge of the cam 56 is moved over a lug 75 on the locking pin 70 forcing the pin downwardly against the tension of its spring 72 and withdrawing the upper end of the pin from the locking pin recess 78 in the turret thereby releasing the turret for rotation when the turret is picked up by the cap.

The cam is so constructed that the locking pin 70 is withdrawn sufficiently to release the turret to rotation while the cam occupies an intermediate position of travel over the lug 75. Before the cam leaves the lug the cap will have been rotated to bring recess 48 into position to receive the ratchet pin 50 and the turret will be rotated sufficiently to displace the recess 78 in which the locking pin was engaged relative to the pin. Upon further rotation of the turret the cam 56 now passes over lug 75 and releases the locking pin 70 to the pressure of its spring which urges the pin upwardly against the under face of the turret.

When the turret has been rotated sufficiently to bring a succeeding recess 78 into registry with the locking pin the pin is urged thereinto and locks the turret to the base and thereby indexes the succeeding tool in the turret to the proper position to act upon the work. The handle is here shown as having a permitted counterclockwise arc of rotation of substantially 180° to advance the turret 90° to bring the succeeding tool into position. The length of the arc of rotation will, of course, depend upon the number of tools carried by the turret.

During the first stage of rotation of the handle the cap travels freely over the top face of the turret and the cam withdraws the locking pin to release the turret to rotation. Further rotation of the cap with the locking pin held released brings a ratchet pin recess 48 of the cap into registration with the ratchet pin and the turret is picked up for rotation and during this second stage of rotation of the handle the turret is displaced rotatably relative to the locking pin. During the final stage of rotation the locking pin 70 bears against the end face of the turret as the pin has now been released by the cam and the turret continues to be rotated until the next succeeding locking pin recess is brought into registration with the locking pin.

During this counterclockwise rotation of the handle the cap or handle was threaded upwardly over the stationary column 32. At the beginning of the counterclockwise rotation of the handle the cam was disposed to enter above the lug 75 of the locking pin 70 as shown in Figure 4. Following the counterclockwise swinging of the handle and the indexing of a succeeding tool into position, the handle is reversely rotated through the same arc to bring the cam back to its position of starting. During this clockwise rotation the cap threads down over the column until it abuts the upper face of the turret. When the cap is threaded down snugly against the upper face of the turret the cam is again disposed so that upon institution of the counterclockwise rotation the cam will enter above the lug 75 on the locking pin 70 to withdraw the pin as has heretofore been described.

Figure 9:
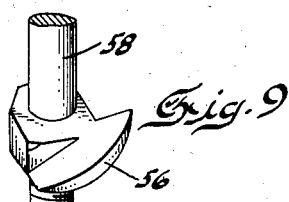
Figure 9 is a perspective of the cam end of the cam rod.

During this clockwise rotation of the cap the cam 56 travels underneath the lug 75. It will be noted in Figure 9 that the cam 56 is a double ended helical cam which is adapted to enter and travel either over or under the lug 75 depending upon the direction of rotation of the cam. The cam rod 58 is displaced axially downwardly against its spring 64 during this clockwise rotation of the cap. The tang 60 of the rod 58 is of such a length and the kerf 62 of the cap is of such a depth that the tang remains within the kerf during this limited axial displacement of the rod so that the rod continues to rotate with the cap.

Figure 8:
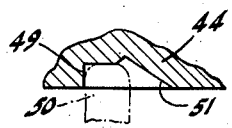
Figure 8 is a vertical sectional view taken on the line 8—8 of Figure 6.

The recesses 48 in the end face of the cap are formed with vertical shoulders 49 to engage the ratchet pin 50 to rotate the turret with the cap in one direction of rotation of the cap. These recesses are also formed with sloping shoulders 51 to permit the recesses to pass freely over the ratchet pin 50 in the opposite direction of rotation of the cap as shown in Figure 8.

It will be apparent therefore that simple sturdy mechanism is here provided whereby the tool carrying turret of the holder may be progressively rotated to bring successive tools into working position through the swinging of a single handle as hereinabove described.

What I claim is:

1. In a tool holder, a base provided with an upright tubular cylindrical column, a turret rotatably mounted upon the column superimposing the base, a handle rotatably mounted upon the column superimposing the turret, means operable to automatically couple the turret with the handle to rotate therewith in one direction of rotation of the handle and to permit the handle to rotate independently of the turret in the opposite direction of rotation of the handle, a locking pin spring urged to lock the turret to the base against rotation, a cam rod extending rotatably and axially shiftably through the tubular column and coupled at one end with the handle for rotation thereby at axially shifted positions of the rod, said rod provided at the opposite end with a cam operable in one direction of rotation to engage the locking pin and shift it axially to release the turret from the base and operable in the opposite direction of rotation to engage the locking pin without actuating it and to itself shift axially as it travels over the locking pin.

2. In a tool holder, a base, a tool carrying turret rotatably supported above the base and provided in the face superimposing the base with an indexed plurality of locking pin receiving recesses, a handle rotatably supported above the turret, means operable to releasably couple the turret with the handle to rotate therewith in one direction of rotation of the handle and adapted to permit the handle to be rotated in the reverse direction of rotation independently of the turret, a locking pin mounted within the base and spring urged to engage within successive recesses in the turret to lock the turret to the base against rotation, a cam rod extending rotatably through the turret and coupled at one end with the handle to rotate therewith while having limited axial movement relative thereto, said cam rod provided with a cam at its lower end adapted upon rotation in a given direction to engage one side of a part on the locking pin to shift the pin axially and release the turret for rotation, said cam adapted upon reverse rotation to engage the opposite side of said part to shift said cam rod axially without actuation of the pin and spring means holding the cam rod toward its coupling engagement with the handle.

3. In a tool holder, a base provided with an upright tubular cylindrical column threaded at its upper end, a tool carrying turret rotatably mounted upon the column directly above the base and provided in its face directly above the base with an indexed plurality of locking pin receiving recesses, a handle rotatably threaded upon the column above the turret, ratchet mechanism operable to couple the turret with the handle to rotate therewith in one direction of rotation and operable to permit the rotation of the handle independently of the turret in the opposite direction of rotation, a locking pin carried by the base and spring urged to engage within successive recesses in the turret to lock the turret to the base against rotation, a cam rod extending rotatably through the column and coupled at its upper end with the handle to rotate therewith while having limited axial movement with respect thereto, spring means urging said rod toward the handle, said rod provided with a double ended helical cam adapted upon rotation of the rod in a given direction to engage the locking pin and actuate it axially against its spring to release the turret for rotation, said cam adapted upon reverse rotation to engage the locking pin and travel thereover actuating the cam rod axially, said handle adapted when threadedly rotated to bear against the turret to so position the cam that upon inception of reverse rotation of the handle the cam will engage the pin to actuate it axially.

4. In a tool holder, a base, a tool carrying turret rotatably supported above the base and provided in the face superimposing the base with an indexed plurality of locking pin receiving recesses, a handle rotatably supported above the turret, means operable to releasably couple the turret with the handle to rotate therewith in one direction of rotation of the handle and adapted to permit the handle to be rotated in the reverse direction of rotation independently of the turret, a locking pin mounted within the base and spring urged to engage within successive recesses in the turret to lock the turret to the base against rotation, said locking pin provided with a radial shoulder, a cam rod extending rotatably through the turret and coupled at one end with the handle to rotate therewith while having limited axial movement relative thereto, said rod provided at its opposite end with a double ended helical cam adapted upon rotation in one direction to engage the shoulder of the locking pin to actuate the pin axially and release the turret for rotation and upon rotation in the opposite direction to engage the shoulder and shift the cam rod axially without actuation of the pin.

VLADIMIR JANKOWSKI.

REFERENCES CITED

The following references are of record in the file of this patent:

UNITED STATES PATENTS

| Number | Name | Date |
|---|---|---|
| 1,662,959 | Crumrine | Mar. 20, 1928 |
| 1,664,851 | Class | Apr. 3, 1928 |
| 2,305,728 | Millholland | Dec. 22, 1942 |

FOREIGN PATENTS

| Number | Country | Date |
|---|---|---|
| 114,954 | Germany | Dec. 15, 1900 |
| 481,739 | Great Britain | Mar. 16, 1938 |